(12) United States Patent
Tsubouchi

(10) Patent No.: US 8,169,552 B2
(45) Date of Patent: May 1, 2012

(54) TELEVISION RECEIVER

(75) Inventor: Akinori Tsubouchi, Takarazuka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 639 days.

(21) Appl. No.: 12/321,682

(22) Filed: Jan. 23, 2009

(65) Prior Publication Data

US 2010/0188586 A1    Jul. 29, 2010

(51) Int. Cl.
*H04N 5/60*    (2006.01)
(52) U.S. Cl. .................. 348/738; 348/553; 348/569
(58) Field of Classification Search .................. 348/553, 348/725, 738, 569; 381/61
See application file for complete search history.

(56) References Cited

U.S. PATENT DOCUMENTS

2007/0058033 A1* 3/2007 Tsai et al. .................. 348/14.05
2010/0013996 A1* 1/2010 Kang et al. .................... 348/553

FOREIGN PATENT DOCUMENTS

JP    S61-027256 A    2/1986

* cited by examiner

*Primary Examiner* — Michael Lee
(74) *Attorney, Agent, or Firm* — Masuvalley & Partners

(57) ABSTRACT

The present invention relates to a television receiver including a controller, which indicates a plurality of selectable items being involved in contents of a program displayed on a screen, a memory, which holds a plurality of predetermined audio settings corresponding to the plurality of selectable items, and a processor which selects an audio setting from the plurality of predetermined audio settings and outputs the selected audio setting corresponding to an item selected from the plurality of selectable items.

14 Claims, 10 Drawing Sheets

TELEVISION RECEIVER

TECHNICAL FIELD

The present invention relates to a television receiver which can be set to automatically output an audio signal suitable for a program projected on a screen.

BACKGROUND OF THE INVENTION

A conventional television receiver, which is provided with a picture menu and sound menu, has been designed to independently change settings for picture and audio. Therefore, in the conventional television receiver, the setting for the audio will not be changed just by changing the setting for the picture, and thus a separate sound setting is required to output a sound suitable for a program. For this reason, users are required to perform unnecessary operation, and this was causing a trouble. Further, there has been an issue where it is difficult to provide a sound setting which enables users to sufficiently feel the difference when the users change the setting because audio circuits and speakers normally provided to the television receivers are generally not superior in characteristics. Further, there has been circumstances where an enhanced sound setting is required when the user changes the audio setting because the user needs to feel the difference in sound and it is also difficult to provide the same number of types of sound menus as the picture menus The conventional television receiver is provided with a character signal extracting apparatus, a character signal selection unit and an automatic audio selection unit. In the television receiver, the character signal extracting apparatus extracts a multiplexed character signal and further extracts an individual character signal from the multiplexed character signal. The character signal selection unit functions to select the character signal extracted by the character signal extracting apparatus. The automatic audio selection unit automatically selects either one of a main audio signal or sub audio signal corresponding to the selected character signal. The selection of the audio signal is performed in conjunction with the selection of character signal.

As described above, the conventional television receiver etc., which automatically selects main audio signals or sub audio signals, has exited. However, there was no television receiver capable of automatically outputting an appropriate sound corresponding to a program displayed on a screen.

SUMMARY OF THE INVENTION

One aspect of the present invention is a television receiver including a controller, which indicates a plurality of selectable items being involved in contents of a program displayed on a screen, a memory, which holds a plurality of predetermined audio settings corresponding to the plurality of selectable items, and a processor, which selects an audio setting from the plurality of predetermined audio settings, the selected audio setting corresponding to an item selected from the plurality of selectable items.

By having the above-mentioned structure in the television receiver, it is not necessary to change the audio setting independently from the picture setting in order to output an audio suitable for the picture projected on the screen. For this reason, the number of operation for a user may be reduced without requiring an unnecessary operation to the user. Further, because the audio is automatically switched, the user does not need to feel the difference of the audio, thereby the audio is not needed to be enhanced. Further, because the audio is switched automatically, a subtle and natural audio setting can be made, thereby, it can be possible to have the same number of the audio settings as the number of the picture menus.

Each of the plurality of the predetermined audio settings may have a different audio frequency characteristic with each other. Each of the plurality of the predetermined audio setting may be set up so as to provide different audio quality with each other. Here, the audio quality may include a surround-sound effect. Each of the predetermined audio settings may be set up so as to provide different audio volume with each other.

By changing the audio setting with various means as described above, more subtle and fine audio can be outputted. This enables to prepare various kinds of audio setting that can widely respond to various kinds of programs. Further, the audio, which is more suitable for the program, can be provided.

The selectable items may include a movie program or a sport program. The selectable items may include a news program, a game or a standard program.

By dividing the programs that can be selected by users into broad categories as described above, the setting operation, which is easy to select and understand by the users, can be provided.

The memory may hold at least three different values of the audio settings. The television receiver may further have a remote controller, which adjusts an audio setting of the television receiver independently from the predetermined audio settings. The television receiver may further have a remote controller, which adjusts a picture setting of the television receiver independently from the predetermined picture settings.

Another aspect of the present invention is a television receiver including a recognizer, which recognizes a kind of a picture displayed on a screen based on an instruction from outside of the television receiver, an adjuster, which automatically regulates an audio setting to a predetermined value corresponding to the recognized kind of the picture, and an output device, which outputs an audio signal based on the regulated audio setting.

By having the above-mentioned structure in the television receiver, it is not necessary to change the audio setting independently from the picture setting in order to output an audio suitable for picture projected on the screen. For this reason, the number of operation for a user may be reduced without requiring an unnecessary operation to the user. Further, because the audio is automatically switched, the user does not need to feel the difference of the audio, thereby the audio is not needed to be enhanced. Further, because the audio is automatically switched, a subtle and natural audio setting can be made, thereby, it can be possible to have the same number of the audio settings as the number of the picture menus.

The kind of the picture may include at least one of contents related to a movie program, a sport program, a news program, a game, or standard program.

By dividing the programs that can be selected by users into broad categories as described above, the setting operation, which is easy to select and understand by the users, can be provided.

The adjuster may regulate the audio setting so that the output device is capable of outputting audio signals suitable for the movie program. The adjuster may regulate the audio setting so that the output device is capable of outputting audio signals suitable for the sport program.

The adjuster may regulate the audio setting so that the output device is capable of outputting audio signals suitable for the news program. The adjuster may regulate the audio setting so that the output device is capable of outputting audio signals suitable for the game.

By providing the audio setting capable of responding to the various programs as described above, the needs of users can be responded more finely.

Another aspect of the present invention is a television receiver including a controller, which holds a plurality of selectable items being involved in a picture displayed on a screen, and a processor, which automatically switches an audio setting so as to correspond a selected item when the item is selected from the plurality of selectable items, the audio setting corresponding to the selected item being predetermined.

By having the above-mentioned structure in the television receiver, it is not necessary to change the audio setting independently from the picture setting in order to output an audio suitable for the picture projected on the screen. For this reason, the number of operation for a user may be reduced without requiring an unnecessary operation to the user. Further, because the audio is automatically switched, the user does not need to feel the difference of the audio, thereby the audio is not needed to be enhanced. Further, because the audio is switched automatically, a subtle and natural audio setting can be made, thereby, it can be possible to have the same number of the audio setting as the number of the picture menu.

The processor may switch a frequency characteristic of the audio setting to correspond the selected item. The processor may switch audio quality of the audio setting to correspond the selected item. The processor may switch a surround-sound effect of the audio setting to correspond the selected item.

By changing the audio setting with various means as described above, more subtle and fine audio can be outputted. This enables the television receiver to prepare various kinds of audio settings that can widely respond to various kinds of programs. Further, an audio, which is more suitable for the program, can be provided.

The selectable items may have at least three different kinds of the selectable items being involved in the picture displayed on the screen.

DETAILED DESCRIPTION OF INVENTION

Figure 1:
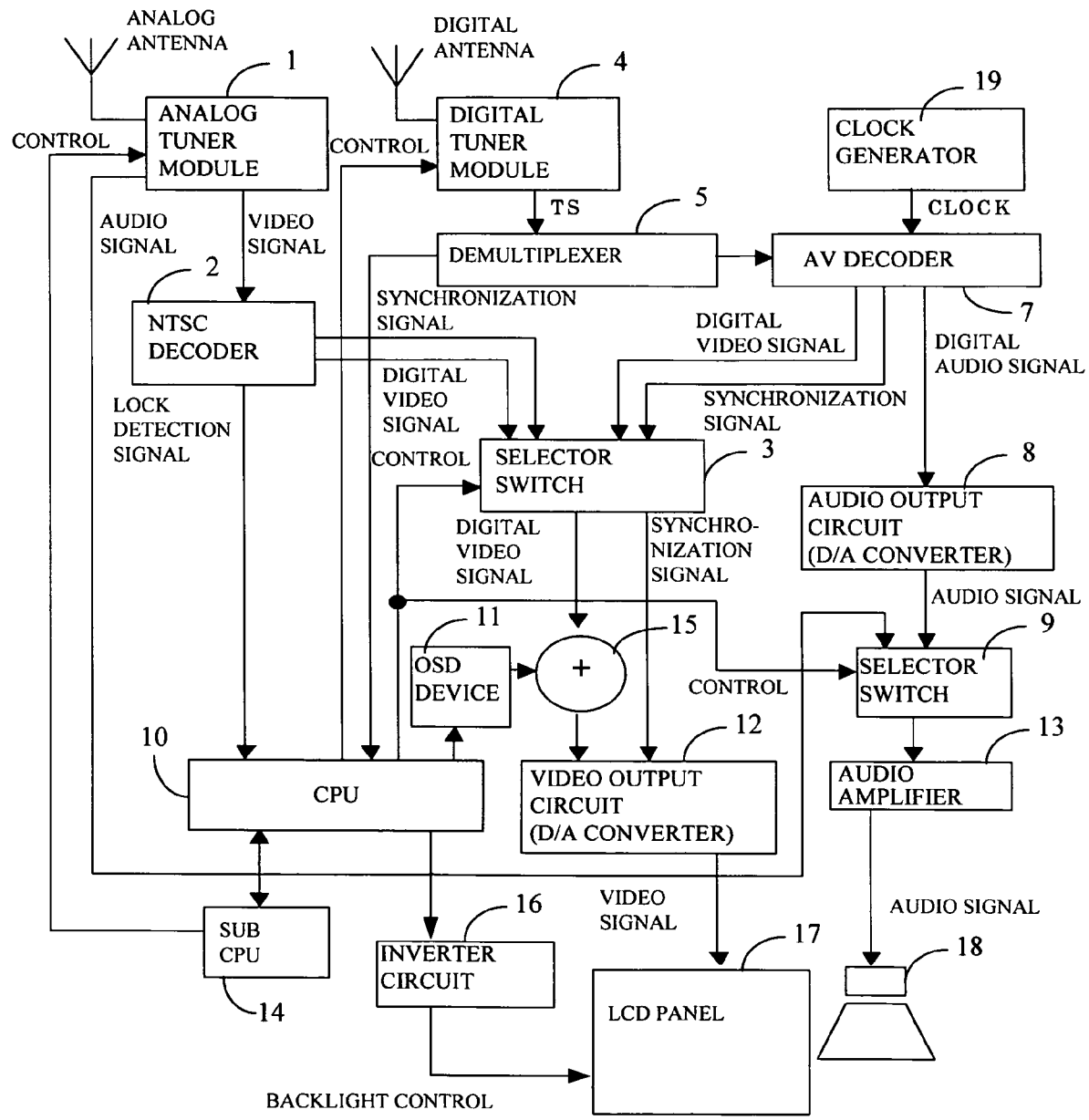
FIG. 1 is a block diagram illustrating an example of a television receiver of the present invention.

FIG. 1 is a block diagram illustrating a television receiver which is capable of receiving an analog broadcast and digital broadcast.

A digital antenna is arranged outdoor facing to a predetermined direction. The digital antenna receives a digital broadcast signal and inputs it to a digital tuner 4. Further, an analog antenna receives an analog signal and gives it to an analog tuner 1.

The digital tuner 4 picks up a signal with a specific frequency from a high-frequency digital modulated signal containing picture/audio data. Further, by having a demodulation circuit, a reverse interleave circuit, an error correction circuit etc., the digital tuner 4 outputs a transport stream by demodulating the selected digital modulated signal.

A demultiplexer (DEMUX) 5 inputs a transport stream from the tuner 4 based on an instruction of a CPU 10, and separates it into a video steam of MPEG2 (Moving Picture Experts Group 2), an audio stream and PSI/SI (Program Specific Information/Service Information) being adjunct information. The demultiplexer 5 selects video/audio stream of a digital broadcast from the instruction of the CPU 10, supplies them to an AV decoder 7 and supplies a program information contained in the PSI/SI (ex. name of the program, starting time of the program, duration of the program, contents information of the program, genre information of the program) to the CPU 10. The analog tuner 1 picks up an audio signal and video signal from the signal received from the antenna. The video signal that is picked up is transmitted to a NTSC decoder 2. The audio signal that is picked up is outputted from a speaker 18 through an audio amplifier 13 after transmitted to a selector switch 9.

The AV decoder 7 is provided with a video decoder for decoding a video stream and an audio decoder for decoding an audio stream. The video decoder decodes the inputted variable-length code to obtain a quantized coefficient or a motion vector, and performs a motion-compensated control etc. based on a reverse-DCT conversion or the motion vector. The audio decoder decodes the inputted code signal to generate an audio data. The video data generated by decoding is outputted to a video output circuit 12 through a selector switch 3 and the audio data is outputted to the audio output circuit 8.

The video output circuit 12 receives the video data and performs D/A (digital/analog) conversion to convert the video data into a composite video signal, for example. The audio output circuit 8 receives the audio data outputted from the AV decoder 7 and performs D/A conversion to generate an analog signal of right (R) sound and left (L) sound and an analog signal of main sound and sub sound.

Further, the video output circuit 12 and audio output circuit 8 are provided with an output resistance, an amplifier, etc. The AV output terminal that receives a signal from the video output circuit 12 and audio output circuit 8 is provided with an output section (a set of left/right audio output terminals or a video output terminal), and a LCD panel 17 and speaker 18 are connected to this output section through a video/audio cord. In addition, the audio signal from the audio output circuit 8 is converted into sound by being transmitted to the speaker 18 after the audio signal has been transmitted to the audio amplifier 13 through the selector switch 9.

An OSD (on-screen display) device 11 generates a video data based on the character information or color information outputted and instructed from the CPU and outputs the data to an adder 15. The adder 15 performs a process to incorporate the video data into the received video data outputted from the AV decoder 7. This OSD device 11 can display an electronic program guide, a menu screen and various setting screens (channel setting screen etc.). A clock generator 19 controls the time treated in the television receiver.

Figure 2:
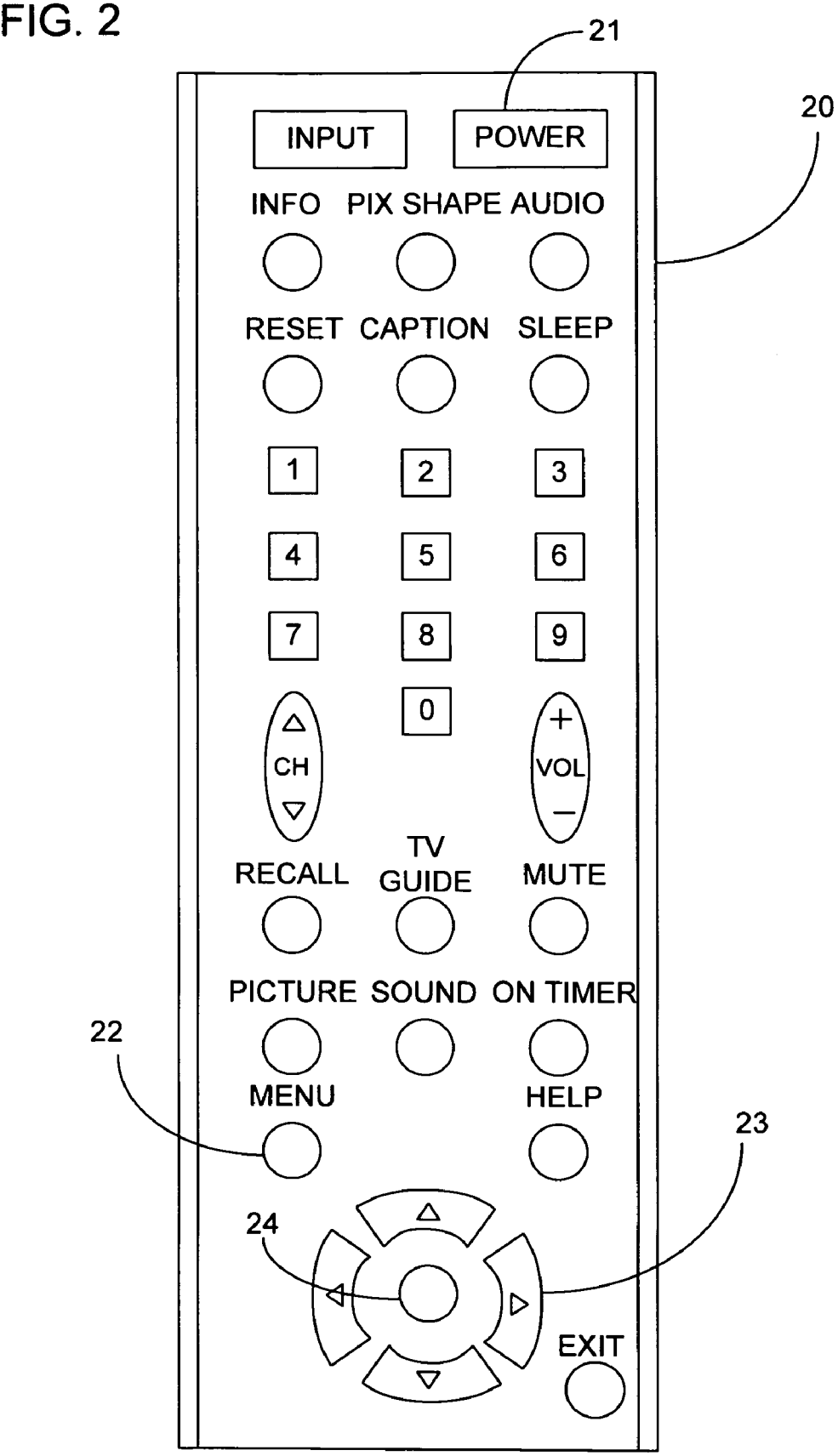
FIG. 2 illustrates an example of a remote controller used to remotely-control a television receiver pertaining to the present invention.

A remote transmitter (remote controller) 20 is provided with various keys as shown in FIG. 2 to transmit various instructions to the television receiver. When operating the key, a signal light (remote control signal) which is an instruction corresponding to that key, is transmitted from a light emitting section. A SUBCPU 14 receives the signal light, converts this into an electric signal, and transmits it to the CPU 10. The SUBCPU 14 operates as a controller for a television receiver. For example, it is used to control a standby state of a television receiver, or acts as a remote control receiver. An inverter circuit 16 transmits the signal received from CPU 10 to LCD panel 17, and plays a role of converting the direct current to the alternating current.

In a memory (for example, RAM, EEPROM, a flash memory, etc.) (not shown), a channel information (frequency information, information such as a channel list corresponding to number keys) and various setting information are stored in addition to the information (program information) for displaying EPG (electronic program guide) screen.

The CPU 10 is to perform overall control of this digital television receiver. Particularly, as the processes related to the present invention, channel information obtaining process, channel preset setting, channel skip setting and channel selection process and setting process etc. corresponding to the key operation of the remote control transmitter 20 are performed.

Next, the remote controller which is capable of operating the television receiver pertaining to the present invention will be explained. FIG. 2 illustrates an example of the remote controller 20 which can be used in the present invention. The remote controller 20 is provided with various input buttons, such as a POWER 21, a MENU 22, a Cursor Operating Key 23, an ENTER 24. The power of the television receiver can be turned on or off by the POWER 21. Further, by the MENU 22, it becomes possible to enter into a screen, in which various settings of the television receiver (picture setting, audio setting etc.) can be changed. Various options are displayed on the screen when the television receiver is entered into the menu screen, and a user moves a cursor to those options by using the cursor operating key 23 and pressing the ENTER 24 to select the option. The operating method of the remote controller pertaining to the present invention is not specifically limited. However, the remote controller may normally be used by the method described above.

The concrete examples of the television receiver pertaining to the present invention have been explained above. However, the present invention is not limited to the subjects relate to these concrete examples. Cathode-ray tube televisions, liquid crystal televisions, plasma televisions, projection televisions, video projectors, organic EL (Electro Luminescence) televisions, etc. are included in the television receiver pertaining to the present invention. Further, types or arrangements for the components in the television receiver are not limited as long as pictures are projected on the display. Further, the television receiver does not need to be provided with the remote transmitter in the form described above. And the television receiver may have a remote transmitter in a different form or may not have a remote transmitter.

Next, functions of the components provided to the television receiver pertaining to the present invention will be explained and contents of the present invention will also be explained. The present invention is to provide picture items, such as, a movie program, sport program, news program, game, standard program, etc., to a user of the television receiver as a menu, and automatically output an audio signal suitable for a selected picture item from the speaker when the user selects any of the picture items. Namely, in the present invention, when a user selects the sport program as the picture item, an audio signal suitable for viewing the sport program (e.g. an audio signal etc. which conveys an impact of the sport to users) is outputted from the speaker without having the user manually change the audio setting items that exist in various types.

Figure 3:
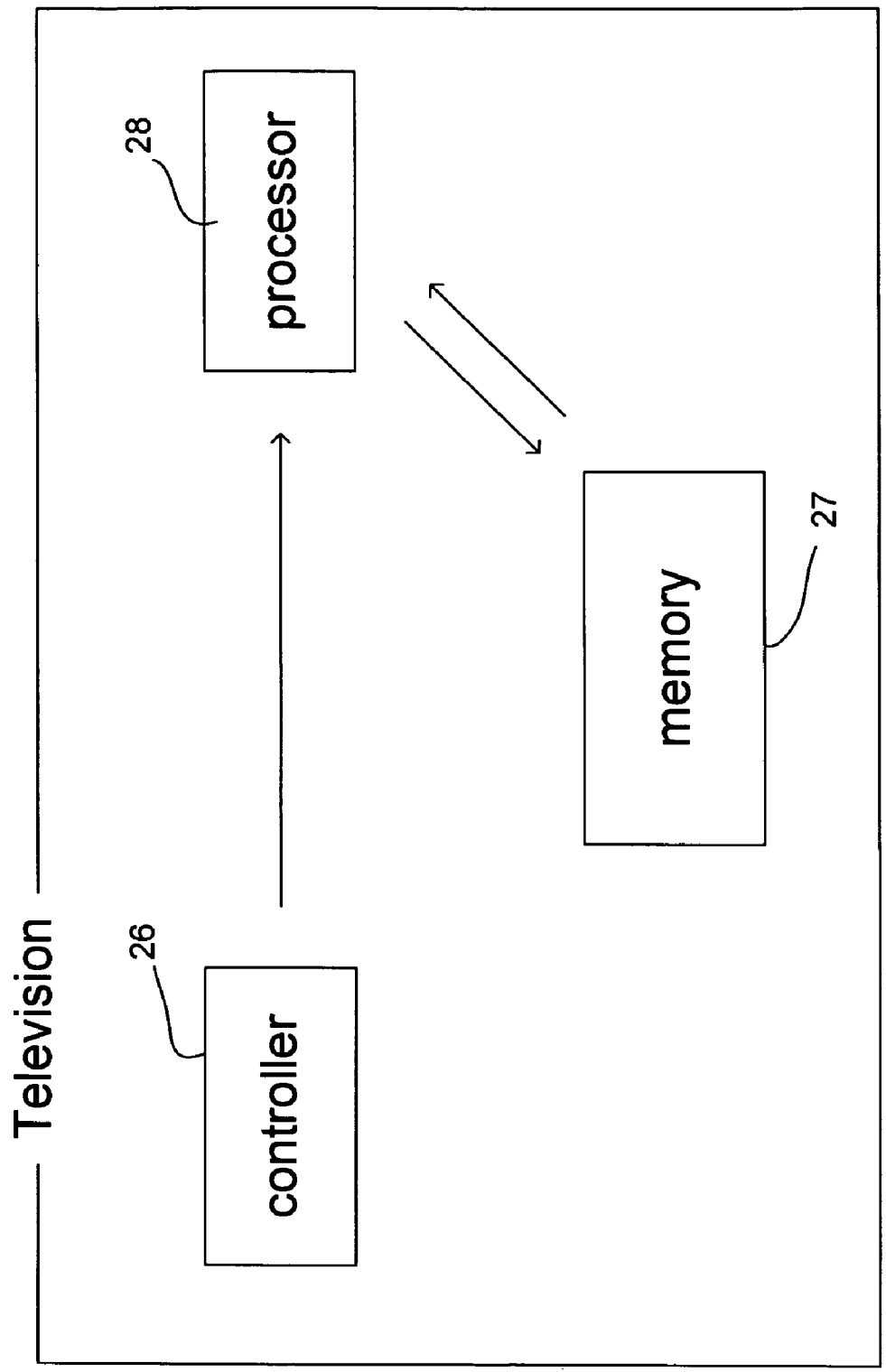
FIG. 3 illustrates an example of components provided to a television receiver pertaining to the present invention.

As shown in FIG. 3, the television receiver pertaining to the present invention has components of a controller 26, a memory, 27, and a processor 28. Normally, the controller 26 firstly displays picture menus, such as, movie program, sport program, news program, game, standard program, etc. on the screen of the television receiver. A user selects any one from these picture menus. When any of the menus has selected, the controller 26 detects the menu and recognizes which one of the picture items has been selected. Then, the controller 26 transmits a signal corresponding to the picture item to the processor 28.

In the memory 27, a plurality of predetermined audio settings are stored. For example, an audio setting for outputting an audio signal suitable for the movie program, an audio setting for outputting an audio signal suitable for the sport program etc. are stored in the memory 27. The processor 28 which received the signal from the controller 26, selects an audio setting suitable for the received signal from the memory 27. Then, an audio signal based on the selected audio setting is outputted in response to the picture display on the screen. The above is the contents of the general functions performed by the components provided in the television receiver.

Here, there may be various kinds of the audio settings stored in the memory 27. The setting items of the audio are not specifically limited and any types of setting items may be provided. For example, adjustment item for a frequency of audio, adjustment item of sound quality including a surround sound effect, adjustment item for volume etc., may be provided as the audio setting items.

Concretely, for example, there may be an adjustment item relates to high and low of sound, adjustment item relates to an intonation of sound (difference in pitch of outputted sound), etc. in the adjustment item for a frequency of audio. Further, for example, samples related to expressions of feelings, such as joy, sorrow, anger, cold, etc may be provided in the adjustment items for sound quality in advice, and there may be provided items for selecting any of the expressions, or items for adjusting the degree of each expression. In such a case, for example, when the "joy" is selected, a portion or all of the audio which is outputted corresponding to the picture is outputted to express joy. Further, the adjustment for the degree of expression may be made by setting up such that for example, there are degrees from 1 through 9 to express "joy", the degree of expressing "joy" is the lowest when 1 is selected, and the degree of expressing "joy" is the highest when 9 is selected.

Further, for example, prepare rock style, pop style, classic style, opera style, jazz style etc. samples in the adjustment item of sound quality, and items for selecting those samples or items for adjusting degrees for these items may be provided. Further, for example, in the adjustment item for sound quality, there may be an item for adjusting a degree for outputting a special effect. In this item, for example, there may be an item which can adjust the degree of output whether to enhance or weaken the audio signal in a high frequency portion. Further, there may be an item for changing a sound speed. The sound settings stored in the memory may be predetermined by combining each of the setting adjustments described above and stored in the memory. Therefore, the memory will have unlimited numbers of kinds of the sound settings.

As an example of the audio setting, a setting pattern 1, in which the sound is outputted higher than the normal and a special effect is outputted, setting pattern 2, in which a lower-frequency section of the sound signal is enhanced and outputted, etc. may be set up in advance. Then, the processor may select any of these audio settings corresponding to the detected kind of the picture. In addition, the number of the audio settings pattern is not limited and any number of the pattern may be provided in advance.

Meanwhile, the kinds of the picture items are not limited to the movie program, the sport program, the news program, the game and the standard program, and the setting may be made to have any number of kinds. As the kinds other than those described above, for example, a variety program, a documentary program, a music program, a fiction program, a cooking program, a program relating to architectures, a nature-themed program, etc. may be set up in advance. Then, the audio settings corresponding to these picture items may be set up in advance. The number of kind of the sound setting for one picture item is no need to be one. For example, two kinds of sound settings are provided to one picture item and a setting may be made to select either one of them. Further, the standard program in the picture item may be the sound setting which is normally used in a household.

Normally, the controller requests the user to make a selection by displaying the picture menu on the screen of the television receiver. However, the method for requesting may be any methods. For example, without having the controller to display the picture menu on the screen, the contents of the picture menu may be communicated to the user by reading out the picture items listed on the picture menu by voice. According to the voice, the user may make a selection of the picture item by recoding the voice into the television receiver, or by wring the selected item on the screen.

In addition, the television receiver pertaining to the present invention does not need to include three components described above as long as the contents pertaining to the present invention described above can be performed. For example, the processor may have the functions of the processor and controller. Further, two components that share the functions of the processor may be provided. In case when the setting relating to the picture quality for the television receiver pertaining to the present invention is performed, adjustment items, such as, brightness, contrast, color density, color, image sharpness, and noise reduction, may be provided.

Figure 4:
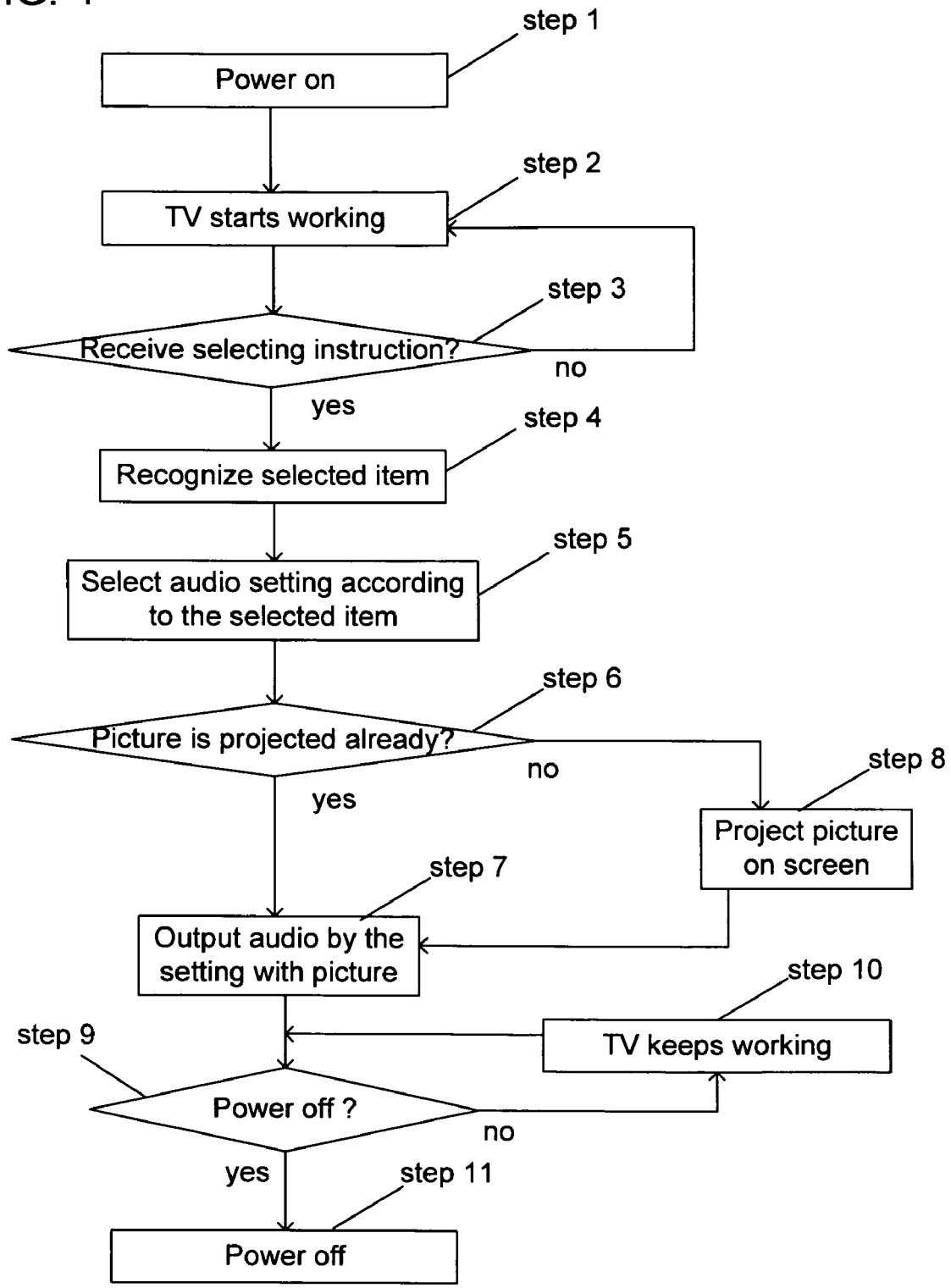
FIG. 4 is a flow chart illustrating an example of an operation pattern of a television receiver pertaining to the present invention.

Next, an operation which is performed by the television receiver pertaining to the present invention will be explained. FIG. 4 is a flow chart relating to a basic operation which is performed by the television receiver. By explaining with reference to FIG. 4, firstly, the television receiver starts working when the power is turned on (steps 1 and 2). Where there is an instruction from a user, the controller displays the picture menu on the screen and waits for a selecting instruction pertaining to the picture item from the user. When there is no selecting instruction pertaining to the picture item, the television receiver continues the normal operation (step 2). When the television receiver receives the instruction for a selection pertaining to the picture item (step 3), the controller recognizes the kind of selected picture item (step 4). Then, the controller communicates the selected picture item to the processor.

Next, the processor selects an audio setting corresponding to the received picture item (step 5). And a determination is made whether the picture is projected on the screen or not (step 6). In a case when the picture is projected on the screen, the processor outputs an audio signal from a speaker based on the audio setting selected according to the picture (step 7). The output of the audio signal based on the selected audio setting may be continuously performed and the duration time is not specifically limited. For example, a time setting can be made regarding the duration time, and the setting may be made in a way that the audio may be set up to return to the audio prior to the selection after elapse of about one hour.

Meanwhile, in a case when no image is projected on the screen, the processor outputs an audio signal from the speaker based on the selected audio setting corresponding to an image (step 7) after projecting the image on the screen (step 8). Thereafter, the television receiver continues to operate and determines whether the power of the television receiver is turned off or not (step 9). When the power of the television receiver is determined to be turned off, the power of the television receiver is turned off (step 11). When the power of the television receiver is determined to be not turned off, the television receiver continues to operate (step 10).

Figure 5:
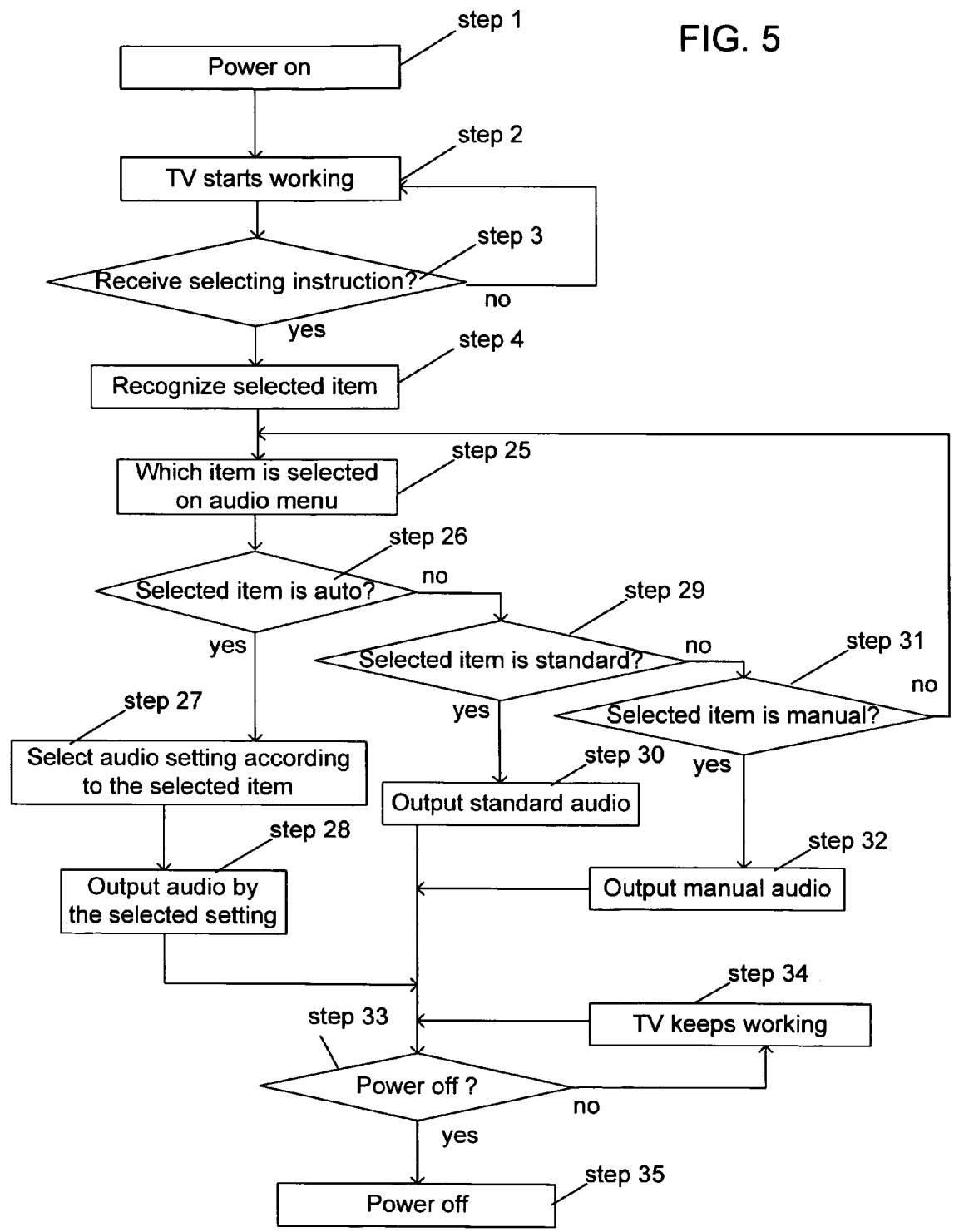
FIG. 5 is a flow chart illustrating an example of an operation pattern of a television receiver pertaining to the present invention.

Next, an operation in a case when the television receiver has various audio menus will be explained. FIG. 5 illustrates an example of an application of the basic operation performed by the television receiver. In FIG. 5, steps 1 through 4 are the same as those explained in FIG. 4. After the processor received the signal pertaining to the selected image item, a determination is made as to which one of the audio menus is selected (step 25). Any items may be provided to the audio menu. However, in a case of "auto", "standard", "manual" are provided to the audio menu is explained here.

The "auto" on the audio menu means that the audio setting will be automatically selected. When the "auto" is selected, the processor selects the audio setting corresponding to the selected picture. Meanwhile, the "standard" in the audio menu means that a predetermined audio setting will be selected no matter what kind of picture item is selected. Therefore, the processor does not select the audio setting corresponding to the selected picture. Further, the "manual" in the audio menu is the item which enables a user to manually set up the audio. Therefore, when the item "manual" is selected, the audio setting which is set up in advance by the user, or the audio setting which is originally set up, will be selected. Thus, again, the processor does not select the audio setting corresponding to the picture in this case. In addition, the items in the audio menu are not limited to these and other kinds of items may also be provided.

Based on these implications, go back to the explanation regarding the operation of the television receiver. When the processor determines whether which one of the audio menus is selected, firstly, a determination is made whether the selected item is "auto" or not (step 26). When the selected item is determined to be "auto", the processor selects the audio setting corresponding to the selected picture item (step 27). Thereafter, an audio signal is outputted based on the setting (step 28). Meanwhile, when the selected item is not determined to be "auto", a determination is made whether the selected item is "standard" or not (step 29). When the selected item is determined to be "standard", an audio signal is outputted based on the "standard" setting regardless of the selected picture item (step 30). Further, when the selected item is not determined to be "standard", a determination is made whether the selected item is "manual" or not (step 31). When the selected item is determined to be "manual", an audio signal is outputted based on an audio value, which is set up by the "manual" regardless of the picture items selected (step 32). Steps 33 through 35 that are the subsequent operations are the same as those explained in steps 9 through 11 explained in FIG. 4.

In addition, the audio menu explained in FIG. 5 is not limited to three items described above. For example, an "advanced manual" may further be provided so that more detailed audio setting can be made manually compare to the case when the "manual" is selected. Contrarily, the number of the audio menu is no need to be three or more items, and it may be two items or one item.

Figure 6:
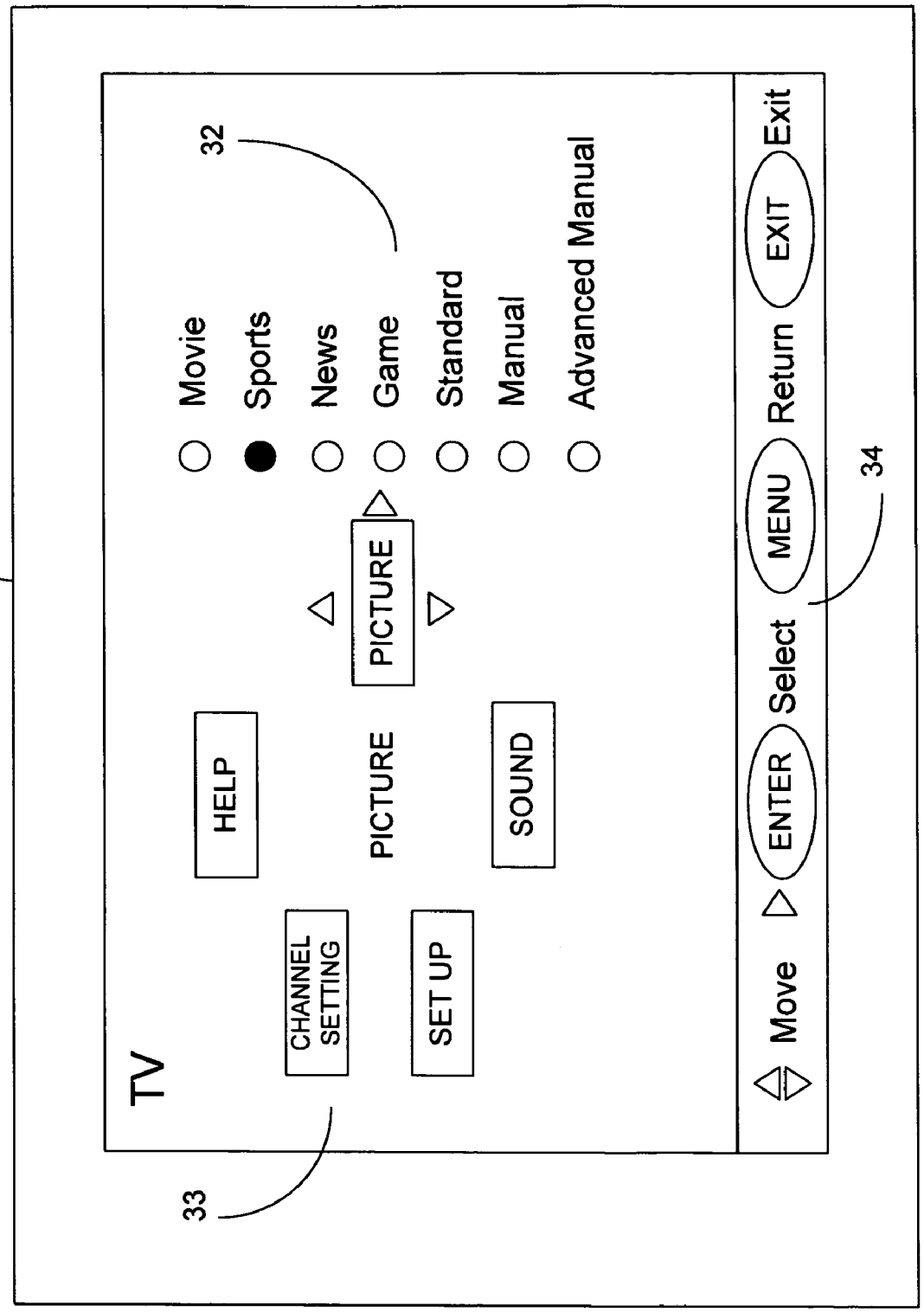
FIG. 6 illustrates an example of an operating method of a television receiver pertaining to the present invention.

Next, a method for selecting items for the picture menu and the audio menu will be concretely explained with reference to FIGS. 6 through 10. FIG. 6 illustrates a screen 30 of the television receiver, and the screen 30 shows a main menu 33 pertaining to the television receiver. The main menu 33 shows "HELP", "PICTURE", "SOUND", "SET UP" and "CHANNEL SETTING", and a cursor is positioned at the "PICTURE". Because the cursor is positioned at the "PICTURE" portion, a picture item 32, which is a portion of a picture menu, is shown on the right side of the screen 30. Similarly, in a case when the cursor is positioned at the "SOUND" section, the right side of the screen 30 may be set up to show a portion of a sound menu. In addition, a cursor movement may be made by using the cursor operating key 23 of the remote controller, and the cursor selection may be confirmed by the "ENTER" 24. Further, the main menu 33 can be entered by pressing the MENU 22. A lower portion 34 of the screen 30 shows an explanation for the user operations.

Figure 7:
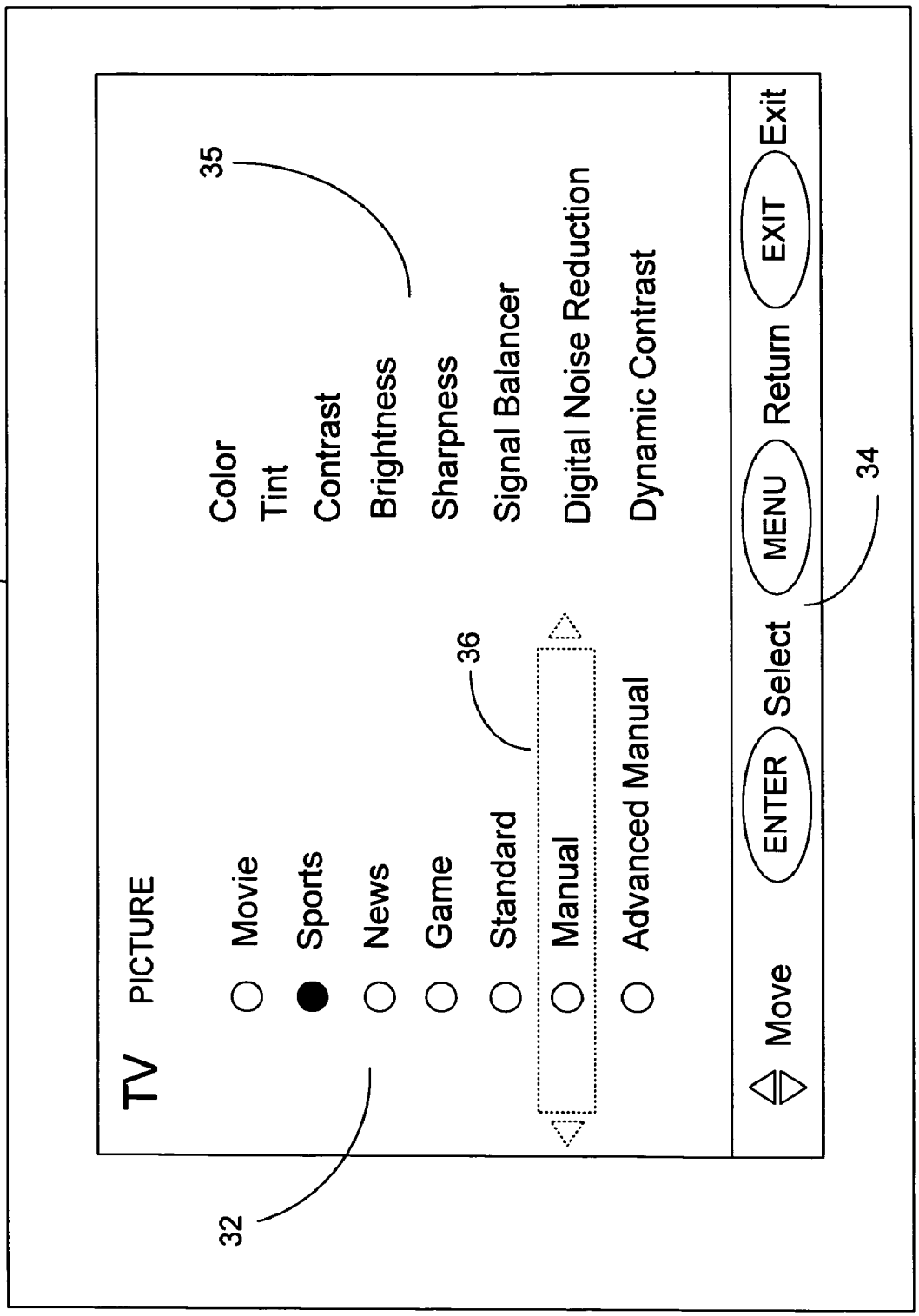
FIG. 7 illustrates an example of an operating method of a television receiver pertaining to the present invention.

FIG. 7 illustrates an example of a screen image displayed on the screen in a case when a user selects the picture menu. In the picture menu, the picture item 32 is shown on the left side portion of the screen, and a detail setting 35 relating to the picture setting is shown on the right side portion of the screen. The user uses a cursor 36 to select the item or setting. On the left side of the "Sports" on the screen, a black circle is shown. And the black circle indicates that a state where the "Sports" is now selected from the picture items. The user may select an item or setting other than the Sports using the cursor 36. In a case when the user selects the detail setting 35, a detailed display setting regarding the picture color or contrast, such as those shown in the screen, can be made, for example.

Figure 8:
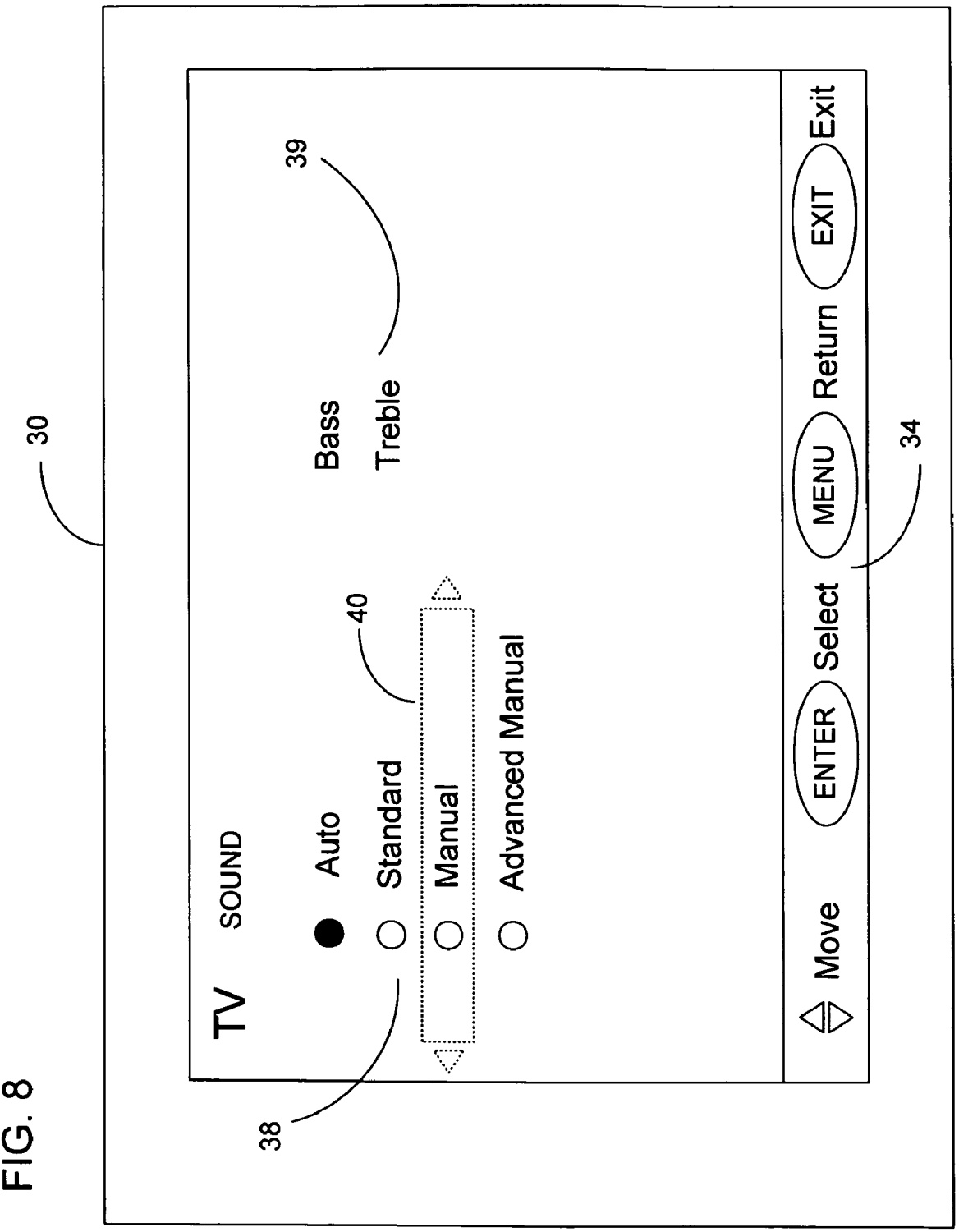
FIG. 8 illustrates an example of an operating method of a television receiver pertaining to the present invention.

FIG. 8 is an example of screen image displayed on the screen in a case when the user selects the audio menu. In the audio menu, an audio item 38 is shown on the left side of the screen, and a detail setting 39 regarding the audio setting is shown on the right side of the screen. Again, the user may select the item or setting by using a cursor 40. Here, on the left side portion of the audio item "Auto" on the screen, a black circle is shown. And the black circle indicates that a state where the "Auto" is now selected from the audio items.

In a case when the "Sports" is selected in the picture menu and the "Auto" is selected in the audio menu as shown in FIGS. 7 and 8, an audio signal suitable for sports is automatically outputted when the user views the program on the screen.

Figure 9:
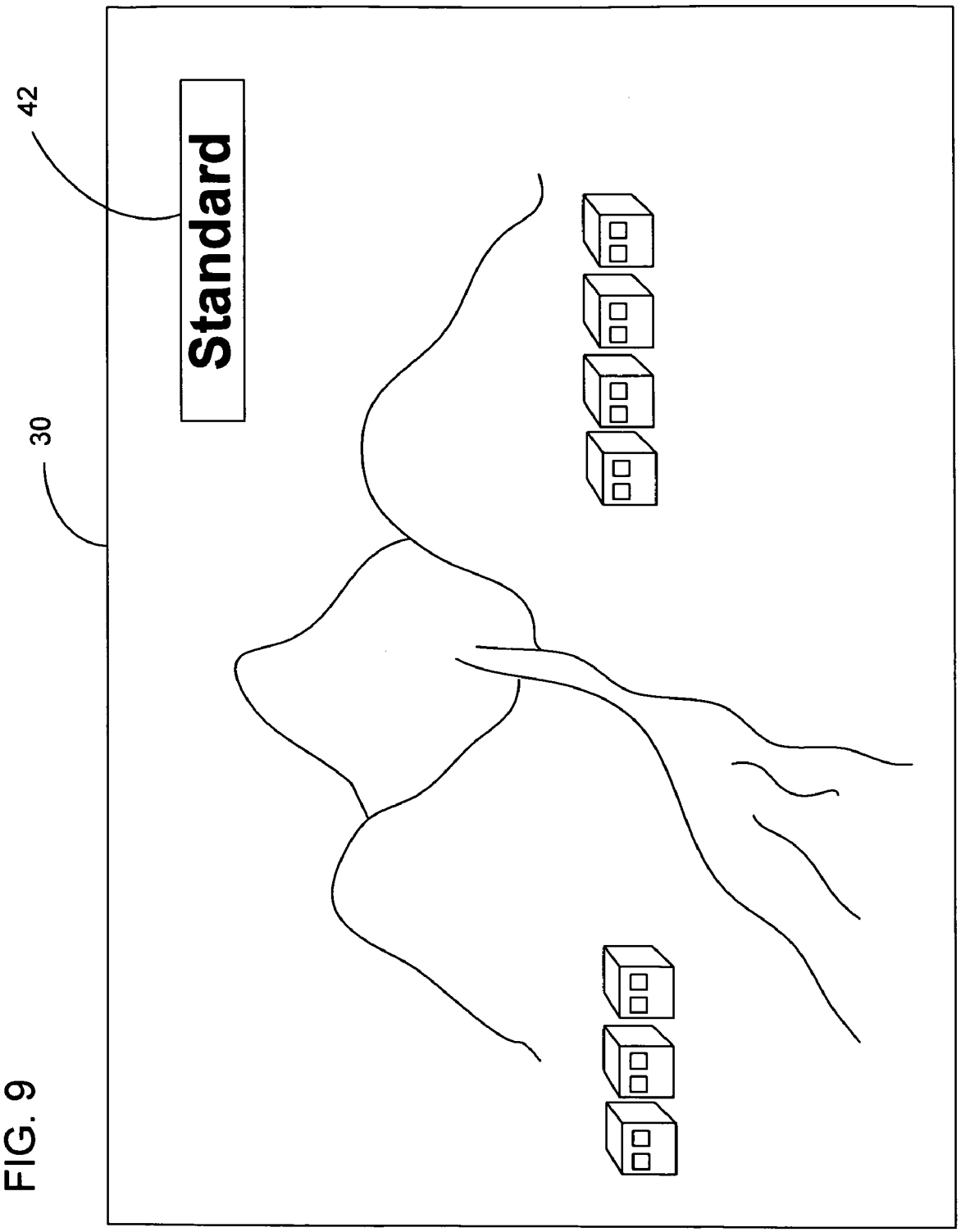
FIG. 9 illustrates an example of an operating method of a television receiver pertaining to the present invention.

FIG. 9 illustrates a state where a program is projected on the screen 30 of the television receiver. On the upper right hand side of the screen, a "standard", which indicates a picture item 42, is shown. As shown here, the user may change the picture item without entering the picture menu screen. The user may switch the picture item 42 displayed on the upper right hand side of the screen in order by pressing the PICTURE button provided to the remote controller. Then the user can select the picture item by pressing the ENTER button which is provided to the remote controller, while the picture item that he or she wants to select is displayed on the screen.

Figure 10:
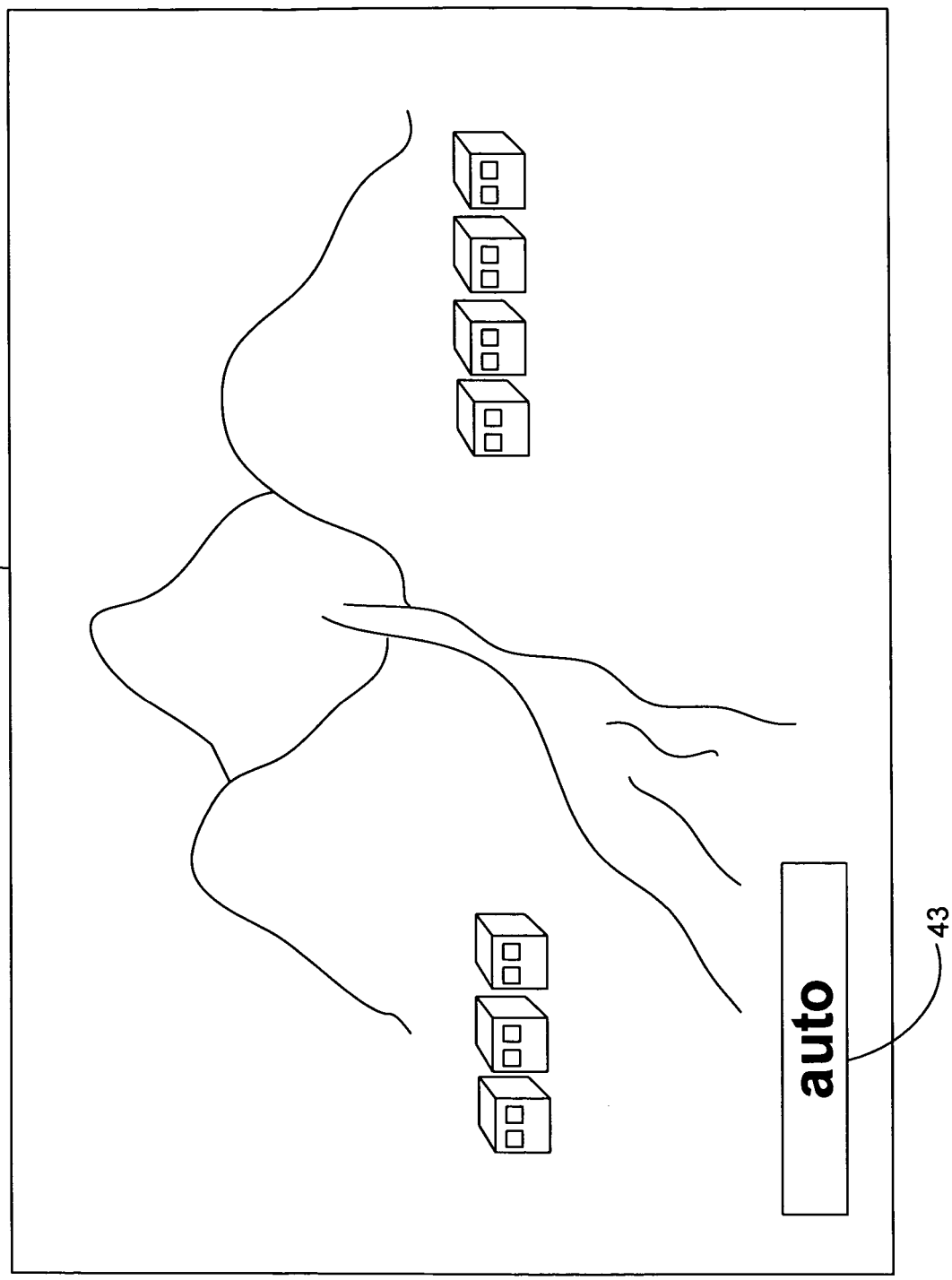
FIG. 10 illustrates an example of an operating method of a television receiver pertaining to the present invention.

In FIG. 10, the screen 30 of the television receiver is shown and the "auto" which indicates an audio item 43 is displayed on the lower left side of the screen. The user can also change the audio item without entering the screen of the audio menu. By pressing the SOUND button provided to the remote controller, the user can switch the audio item 43 displayed on the lower left hand side of the screen in order. Then, the user can select the audio item by pressing the ENTER button which is provided to the remote controller while the audio item that he or she wants to select is displayed on the screen.

The present invention has been explained concretely using the plurality of the drawings and flowcharts. Needless to say, the present invention is not limited to those and no matter how the present invention is carried out, it falls within the technical scope of the present invention as long as the product includes the essential part of the present invention. For example, the automated audio setting of the present invention can be applied to anything as long as programs are executed on a screen, and not limited to the television receivers. For example, the present invention may be applied to electronic products other than television receivers, such as personal computers, video devices, game devices, cellular phones etc.

What is claimed is:

1. A television receiver comprising:
    a screen;
    an audio output device;
    a processor, which shows a menu on the screen, the menu including a plurality of audio settings, and a plurality of selectable items related to program categories;
    a controller, which allows a user to select one of the selectable items shown in the menu; and
    where the processor outputs through the audio output device a sound example about the item the user has selected, and
    where the processor changes an audio setting based on the item the user has selected; and
    a memory, which holds the audio settings corresponding to the item the user has selected.

2. The television receiver of claim 1, wherein each of the selectable items is associated with an audio frequency characteristic different from those of other selectable items.

3. The television receiver of claim 1, wherein each of the selectable items is arranged to provide different audio quality relative to each other, the audio quality including a surround-sound effect.

4. The television receiver of claim 1, wherein each of the selectable items is arranged to output different audio volume relative to each other.

5. The television receiver of claim 1, wherein the selectable items include a movie program or a sport program.

6. The television receiver of claim 1, wherein the selectable items include a news program, a game or a standard program.

7. The television receiver of claim 1, wherein the memory holds at least three different values of the audio settings.

8. The television receiver of claim 1, further comprising:
    a remote controller, which adjusts an audio setting of the television receiver independently from the audio settings corresponding to the item the user has selected.

9. The television receiver of claim 8, wherein the remote controller adjusts a picture setting of the television receiver independently from a predetermined picture setting.

10. A television receiver comprising:
    a processor, which shows a plurality of selectable items containing information relating to a plurality of program categories on a screen;
    a controller, which accepts a user input on a selection of the selectable items;

where the processor controls an audio output device that plays a sound example based on the user's selection; and where the processor further changes an audio setting based on the user's selection; and where the processor also automatically reproduces the audio setting changed by the user based on a category of a program being shown on the screen.

11. The television receiver of claim 10, wherein the processor switches a frequency characteristic of the audio setting to correspond to the user's selection.

12. The television receiver of claim 10, wherein the processor switches audio quality of the audio setting to correspond to the user's selection.

13. The television receiver of claim 10, wherein the processor switches a surround-sound effect of the audio setting to correspond to the user's selection.

14. The television receiver of claim 10, wherein the selectable items have at least three different kinds of the selectable items relating to the plurality of program categories.

* * * * *